US006436355B1

(12) United States Patent
Lee et al.

(10) Patent No.: US 6,436,355 B1
(45) Date of Patent: *Aug. 20, 2002

(54) ELECTRICALLY CONDUCTING POLYMER REACTION VESSELS

(75) Inventors: Martin A Lee; Dario Leslie, both of Salisbury (GB)

(73) Assignee: Her Majesty the Queen in right of Canada, as represented by The Secretary of State for Defence, Farnborough, Hampshire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/319,441
(22) PCT Filed: Nov. 20, 1997
(86) PCT No.: PCT/GB97/03187
§ 371 (c)(1),
(2), (4) Date: Jun. 25, 1999
(87) PCT Pub. No.: WO98/24548
PCT Pub. Date: Jun. 11, 1998

(30) Foreign Application Priority Data

Dec. 6, 1996 (GB) .............................................. 9625442
Jul. 31, 1997 (GB) .............................................. 9716052

(51) Int. Cl.[7] .......................... B01L 7/00; G05D 23/19
(52) U.S. Cl. ....................... 422/199; 422/109; 422/198
(58) Field of Search ................................ 422/102, 109, 422/198, 199

(56) References Cited

U.S. PATENT DOCUMENTS

| 4,156,127 | A | * | 5/1979 | Sako et al. |
| 4,578,588 | A | | 3/1986 | Galkin |
| 4,713,219 | A | | 12/1987 | Gerken et al. |
| 4,735,778 | A | | 4/1988 | Maruyama et al. |
| 4,780,246 | A | | 10/1988 | Naarmann |
| 4,878,597 | A | | 11/1989 | Haast |
| 5,106,538 | A | | 4/1992 | Barma et al. |
| 5,106,540 | A | | 4/1992 | Barma et al. |
| 5,167,929 | A | | 12/1992 | Korf et al. |
| 5,241,363 | A | | 8/1993 | Garner |
| 5,485,734 | A | | 1/1996 | Yang |
| 5,498,392 | A | | 3/1996 | Wilding et al. |
| 5,538,848 | A | | 7/1996 | Livak et al. |
| 5,582,754 | A | * | 12/1996 | Smith et al. |
| 5,601,141 | A | | 2/1997 | Gordon et al. |
| 5,713,864 | A | * | 2/1998 | Verkaart |
| 5,925,467 | A | | 7/1999 | Atrumpier et al. |

FOREIGN PATENT DOCUMENTS

| DE | 27 07 641 A | 8/1978 |
| DE | 31 32 926 A | 7/1982 |
| EP | 0 124 848 | 11/1984 |
| EP | 0 245 994 | 11/1987 |
| EP | 0 560 721 A2 | 9/1993 |
| GB | 2 210 044 A | 6/1989 |

OTHER PUBLICATIONS

Derwent English abstract for DE 3132926*

* cited by examiner

Primary Examiner—Hien Tran
(74) Attorney, Agent, or Firm—Nixon & Vanderhye P.C.

(57) ABSTRACT

A reaction vessel for holding reagents, the vessel made of electrically conducting polymer capable of emitting heat when an electric current is passed through it. The reaction vessel includes a reagent container, such as a capillary tube, slide or chip, in close contact with the electrically conducting polymer. The polymer may be in the form of a film which is wrapped around the tube to form a sheath. This provides a readily controllable heating supply which may be heated and cooled to desired temperatures rapidly. An apparatus suitable for thermal cycling reactions, such as the polymerase chain reaction (PCR) including one or more reaction vessels as well as methods for carrying out such reactions are also described.

10 Claims, 4 Drawing Sheets

ELECTRICALLY CONDUCTING POLYMER REACTION VESSELS

The present invention relates to vessels and apparatus for controlled heating of reagents for example those used in biochemical reactions and to methods for using these.

The controlled heating of reaction vessels is often carried out using solid block heaters which are heated and cooled by various methods. Current solid block heaters are heated by electrical elements or thermoelectric devices inter alia. Other reaction vessels may be heated by halogen bulb/turbulent air arrangements. The vessels may be cooled by thermoelectric devices, compressor refrigerator technologies, forced air or cooling fluids. The reaction vessels fit into the block heater with a variety of levels of snugness. Thus, the thermal contact between the block heater and the reaction vessel varies from one design of heater to another. In reactions requiring multiple temperature stages, the temperature of the block heater can be adjusted using a programmable controller for example to allow thermal cycling to be carried out using the heaters.

This type of heater arrangement is particularly useful for reactions requiring thermal cycling, such as DNA amplification methods like the Polymerase Chain Reaction (PCR). PCR is a procedure for generating large quantities of a particular DNA sequence and is based upon DNA's characteristics of base pairing and precise copying of complementary DNA strands. Typical PCR involves a cycling process of three basic steps.

Denaturation: A mixture containing the PCR reagents (including the DNA to be copied, the individual nucleotide bases (A,T,G,C), suitable primers and polymerase enzyme) are heated to a predetermined temperature to separate the two strands of the target DNA.

Annealing: The mixture is then cooled to another predetermined temperature and the primers locate their complementary sequences on the DNA strands and bind to them.

Extension: The mixture is heated again to a further predetermined temperature. The polymerase enzyme (acting as a catalyst) joins the individual nucleotide bases to the end of the primer to form a new strand of DNA which is complementary to the sequence of the target DNA, the two strands being bound together.

A disadvantage of the known block heaters arises from the lag time required to allow the heating block to heat and cool to the temperatures required by the reaction. Thus, the time to complete each reaction cycle is partially determined by the thermal dynamics of the heater in addition to the rate of the reaction. For reactions involving numerous cycles and multiple temperature stages, this lag time significantly affects the time taken to complete the reaction. Thermal cyclers based on such block heaters typically take around 2 hours to complete 30 reaction cycles.

For many applications of the PCR technique it is desirable to complete the sequence of cycles in the minimum possible time. In particular for example where respiratory air or fluids or foods for human and animal stock consumption are suspected of contamination rapid diagnostic methods may save considerable money if not health, even lives.

An alternative thermal cycler contains a number of capillary reaction tubes which are suspended in air. The heating and cooling of the reaction tubes is effected using a halogen lamp and turbulent air from a fan. The thermal dynamics of this system represent a considerable improvement over the traditional block heater design because heated and cooled air is passed across the reaction tubes and the required temperatures are achieved quite rapidly, the fan providing a homogeneous thermal environment and forced cooling. Using this apparatus 30 reaction cycles can be completed in about 15 minutes.

A disadvantage of this thermal cycler is that air cooling and heating are not readily suitable in multi-shot apparatus, certainly not, mobile or portable such apparatus.

The applicants have developed an efficient system for rapid heating and cooling of reactants which is particularly useful in thermal cycling reactions.

Accordingly, the present invention provides a reaction vessel comprising an electrically conducting polymer which emits heat when an electric current is passed through it.

Electrically conducting polymers are known in the art and may be obtained from Caliente Systems Inc. of Newark, USA. Other examples of such polymers are disclosed for instance in U.S. Pat. Nos. 5,106,540 and 5,106,538. Suitable conducting polymers can provide temperatures up to 300° C. and so are well able to be used in PCR processes where the typical range of temperatures is between 30° and 100° C.

An advantage of the invention over a conventional block heater is derived from the fact that polymers which conduct electricity are able to heat rapidly. The heating rate depends upon the precise nature of the polymer, the dimensions of polymer used and the amount of current applied. Preferably the polymer has a high resistivity for example in excess of 1000 ohm·cm. The temperature of the polymer can be readily controlled by controlling the amount of electric current passing through the polymer, allowing it to be held at a desired temperature for the desired amount of time. Furthermore, the rate of transition between temperatures can be readily controlled after calibration, by delivering an appropriate electrical current, for example under the control of a computer programme.

Furthermore as compared to a block heater, rapid cooling can also be assured because of the low thermal mass of the polymer. If desired however, the reaction vessel may be subjected to artificial cooling to further increase the speed of cooling.

Suitable cooling methods include forced air cooling, for example by use of fans, immersion in ice or water baths etc.

In addition, the use of polymer as the heating element in a reaction vessel will generally allow the apparatus to take a more compact form than existing block heaters, which is useful when carrying out chemical reactions in field conditions such as in the open air, on a river, on a factory floor or even in a small shop.

The reaction vessel may take the form of a reagent container such as a glass, plastics or silicon container, with electrically conducting polymer arranged in close proximity to the container. In one embodiment of the vessel, the polymer is provided as a sheath which fits around the reaction vessel, in thermal contact with the vessel. The sheath can either be provided as a shaped cover which is designed to fit snugly around a reaction vessel or it can be provided as a strip of film which can be wrapped around the reaction vessel and secured.

The polymer sheath arrangement means that close thermal contact is achievable between the sheath and the reaction vessel. This ensures that the vessel quickly reaches the desired temperature without the usual lag time arising from the insulating effect of the air layer between the reaction vessel and the heater. Furthermore, a polymer sheath can be used to adapt apparatus using pre-existing reaction vessels. In particular, a strip of flexible polymer film can be wrapped around a reaction vessel of various different sizes and shapes.

Where a sheath is employed it may be advantageous for it to be perforated or in some way reticulated. This may increase the flexibility of the polymer and can permit even readier access by a cooling medium if the polymer is not itself used to effect the cooling.

In another embodiment of the invention, the polymer is provided as an integral part of the reaction vessel. The reaction vessel may be made from the polymer by extrusion, injection moulding or similar techniques. Alternatively, the reaction vessel may be manufactured using a composite construction in which a layer of the conducting polymer is interposed between layers of the material from which the vessel is made or in which the internal or external surfaces of the reaction vessel is coated with the polymer, or again in which the vessel is basically made of the polymer coated with a thin laminate of a PCR compatible material. Such vessels may be produced using lamination and/or deposition such as chemical or electrochemical deposition techniques as is conventional in the art.

Vessels which comprise the polymer as an integral part may provide particularly compact structures.

If several reaction vessels are required for a particular reaction, any electrical connection points can be positioned so that a single supply can be connected to all the reaction vessels or tubes. The reaction vessels may be provided in an array.

Alternatively, each of or each group of reaction vessels may have its own heating profile set by adjusting the applied current to that vessel or group of vessels. This provides a further and particularly important advantage of reaction vessels with polymer in accordance with the invention over solid block heaters or turbulent air heaters, in that individual vessels can be controlled independently of one another with their own thermal profile. It means that a relatively small apparatus can be employed to carry out a plurality of PCR assays at the same time notwithstanding that each assay requires a different operating temperature. For example, PCR tests for detecting a fair plurality of organisms in a sample can be carried out simultaneously, notwithstanding that the nucleotide sequence which is characteristic of each organism is amplified at different PCR operating temperatures.

The polymer may suitably be provided in the form of a sheet material or film, for example of from 0.01 mm to 10 mm, such as from 1 to 10 mm, and preferably 0.1 to 0.3 mm thick. By using thin films, the volume of polymer required to cover a particular reaction vessel or surface is minimised. This reduces the time taken for the polymer to heat to the required temperature as the heat produced by passing the current through the polymer does not have to be distributed throughout a large volume of polymer material.

In use, the polymer component of the reaction vessel is arranged such that an electric current can be generated within the polymer. This can either be achieved by providing the polymer with connection points for connection to an electrical supply or by inducing an electric current within the polymer, for example by exposing the polymer to suitable electrical or magnetic fields.

The close thermal contact between the polymer and the reagents or reagent container which may be established in the reaction vessels of the invention reduces or eliminates the insulating effect of the air layer between the heating element and the reaction vessel.

In one embodiment of the invention, the vessel comprises a capillary tube. The heat transfer from a capillary tube to reagents contained within it is more rapid than that achieved using conventional reagent vessels as the surface area to volume ratio of the reagents in the capillary tube is larger than in a conventional reagent vessel.

Alternatively the vessel may comprise a flat support plate such as a two-dimensional array in particular a chip such as a silicon wafer chip; or a slide, in particular a microscope slide, on which reagents may be supported. The plate may be made from the polymer or the polymer may be provided as an integral part of the plate, either as a coating on one side of the plate or as a polymer layer within a composite construction as previously described. Where appropriate, and particularly when the plate is a chip, the polymer may be deposited and/or etched in the preferred format on the chip using for example printed circuit board (PCB) technology.

Vessels of this type may be particularly useful for carrying out in-situ PCR for example on tissue samples.

Other suitable reaction vessel are tubes and cuvettes, which are known in the art.

The invention further provides apparatus for reactions requiring multiple temperature stages, said apparatus comprising a reaction vessel as described above, a means for generating an electrical current within the polymer and a control means for regulating the amount of electric current passing through the polymer so as to control its temperature.

The control means is suitably an automatic control means such as a computer controlled interface arrangement. By using a programmable controller for the electrical circuit connected to the polymer, a defined heating regime, for example a defined number of cycles of predetermined temperature stages to be established over predetermined time intervals and dwells can be pre-programmed using the apparatus, including employing different temperature and time profiles with different reaction vessels in the same apparatus at the same time.

The control means may include a temperature monitoring device such as a thermocouple, which monitors the temperature of the reaction vessel and feeds this information into the control system so that the desired regime of heating and/or cooling is adhered to.

Alternatively, the temperature of the polymer may be monitored directly by measuring its resistivity, for example by arranging the polymer heating element as a resistor in a wheats to bridge circuit arrangement. This avoids the use of other temperature measurement devices such as thermocouples.

Optionally, the apparatus further comprises artificial cooling means such as one or more fans.

The apparatus may include a plurality of containers. The polymer may be provided as an integral part of each container, as a sheath around each container or arranged such that a layer of polymer is interposed between adjacent containers. Any electrical connection points on the polymer may be connected to a single electrical supply, if a number of reactions requiring the same temperature stages are being carried out.

However, in a preferred embodiment the apparatus is arranged such that the polymer in contact with (or forming) a container or a group of containers is connected to an individual supply, several containers or groups of containers being connected to different, independently controlled electrical supplies. With this arrangement, a number of different reactions requiring different temperature stages can be carried out at the same time as each container or group of containers has its own heating element. This arrangement allows users to carry out a number of small batch reactions using a single apparatus which has not been possible using existing equipment. The only apparatus previously available for this type of use are certain designs of block heaters which have between 2 and 4 segments which can be heated and cooled independently. However, such apparatus is limited to use for 2 to 4 batches of reactions and has the disadvantage of slow cycle times as previously described.

Where the reaction vessel comprises a slide or chip, the apparatus may comprise the slide or chip, an electrical supply, means for connecting the electrical supply to the slide or chip or for inducing an electrical current in the polymer and a means for controlling the current passing through the polymer layer in the slide or chip.

Reaction vessels and apparatus of the invention can be used in a variety of situations where chemical or biochemical reactions are required to be carried out. Thus the invention further provides a method of carrying out a reaction such as a chemical or biochemical reaction which method comprises heating reagents in a reaction vessel as defined above.

As well as amplification reactions such as PCR reactions already mentioned above, the vessels and apparatus of the invention can be used for the purposes of nucleic acid sequencing and in enzyme kinetic studies wherein are studied the activity of enzymes at various temperatures, likewise other reactions, especially those involving enzymic activity, where precise temperatures need to be maintained, . The reaction vessels of the invention allow precise temperatures to be reached and maintained for suitable time periods, and then changed rapidly as desired, even in mobile or portable apparatus in accordance with some embodiments of the invention.

For PCR reactions, the temperature conditions required to achieve denaturation, annealing and extension respectively and the time required to effect these stages will vary depending upon various factors as is understood in the art. Examples of such factors include the nature and length of the nucleotide being amplified, the nature of the primers used and the enzymes employed. The optimum conditions may be determined in each case by the person skilled in the art. Typical denaturation temperatures are of the order of 95° C., typical annealing temperatures are of the order of 55° C. and extension temperatures of 72° C. are generally of the correct order. When utilising the reaction vessels and apparatus of the invention, these temperatures can rapidly be attained and the rate of transition between temperatures readily controlled.

Generic DNA intercollating dyes and strand specific gene probe assays, eg Taqman® assays as described in U.S. Pat. No. 5,538,848 and Total Internal Reflection Fluorescence (TIRF)assays such as those described in WO93/06241 can of course be employed with many embodiments of the invention. In such assays, a signal from the sample such as a fluorescent signal or an evanescent signal is detected using a fluorescence monitoring device. When this type of process is undertaken, the fluorescence monitoring device must be arranged such that it is able to detect signal emanating from the sample. In some instances, it may be helpful if at least a part of the vessel, for example an end where the vessel is a tube of the invention may be optically clear so that measurements can be made through it. Alternatively the vessel can be provided with means of conveying a signal from the sample to the monitoring device, for example, an optic fibre or an evanescent wave guide.

BRIEF DESCRIPTION OF THE DRAWINGS

Embodiments of the present invention will now be described, by way of example, with reference to the accompanying drawings, wherein FIG. 1. Shows a reaction vessel heater comprising a sheath of electrically conducting polymer arranged to fit around a reaction tube.

In use, the sheath 2 is placed around and in close thermal contact with the reaction vessel 1A. The connection points 3 are then connected to an electrical supply (not shown) and current is passed through the polymer sheath 2, thereby heating it and any reagents inside the reaction vessel 1A.

Figure 1:
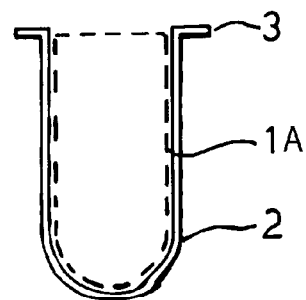
Referring to FIG. 1, a sheath of electrically conducting polymer 2 is provided with electrical connection points 3 for connection to an electrical supply. The size and shape of the sheath 2 is determined by the dimensions and shape of a reaction vessel 1A around which the sheath fits.
Figure 2:
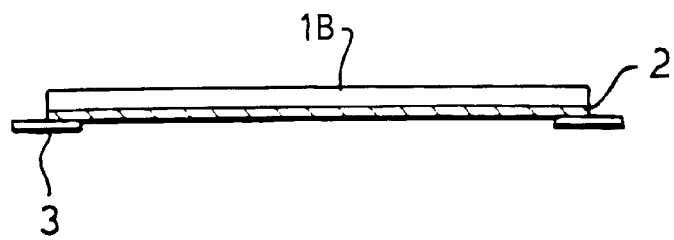
FIG. 2. Shows a reaction slide having an electrically conducting polymer coating over one of its surfaces.

Referring to FIG. 2, a slide 1B is coated on one side with electrically conducting polymer 2. Electrical connection points 3 are provided at either end of the slide 1B, in electrical connection with the polymer layer 2.

Figure 3:
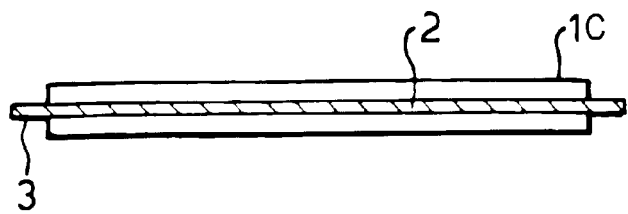
FIG. 3. Shows a reaction slide having a layer of electrically conducting polymer within a composite construction.

In FIG. 3, the vessel comprises a slide 1C having a composite construction such that a layer of electrically conducting polymer 2 is interposed between layers of the usual material used to produce such slides such as glass. Electrical connection points 3 are provided at either end of the slide 1C, in electrical connection with the polymer layer 2. In use, an electrical supply (not shown) is connected to the electrical connection points 3 on the slide shown in FIGS. 2 and 3 and current is passed through the polymer layer 2, thereby heating the slide 1B or 1C and any reagents placed on the slide 1B or 1C.

In use, an electrical supply (not shown) is connected to the electrical connection points 3 on the slide shown in FIGS. 2 and 3 and current is passed through the polymer layer 2, thereby heating the slide 1 and any reagents placed on the slide 1.

Figure 4:
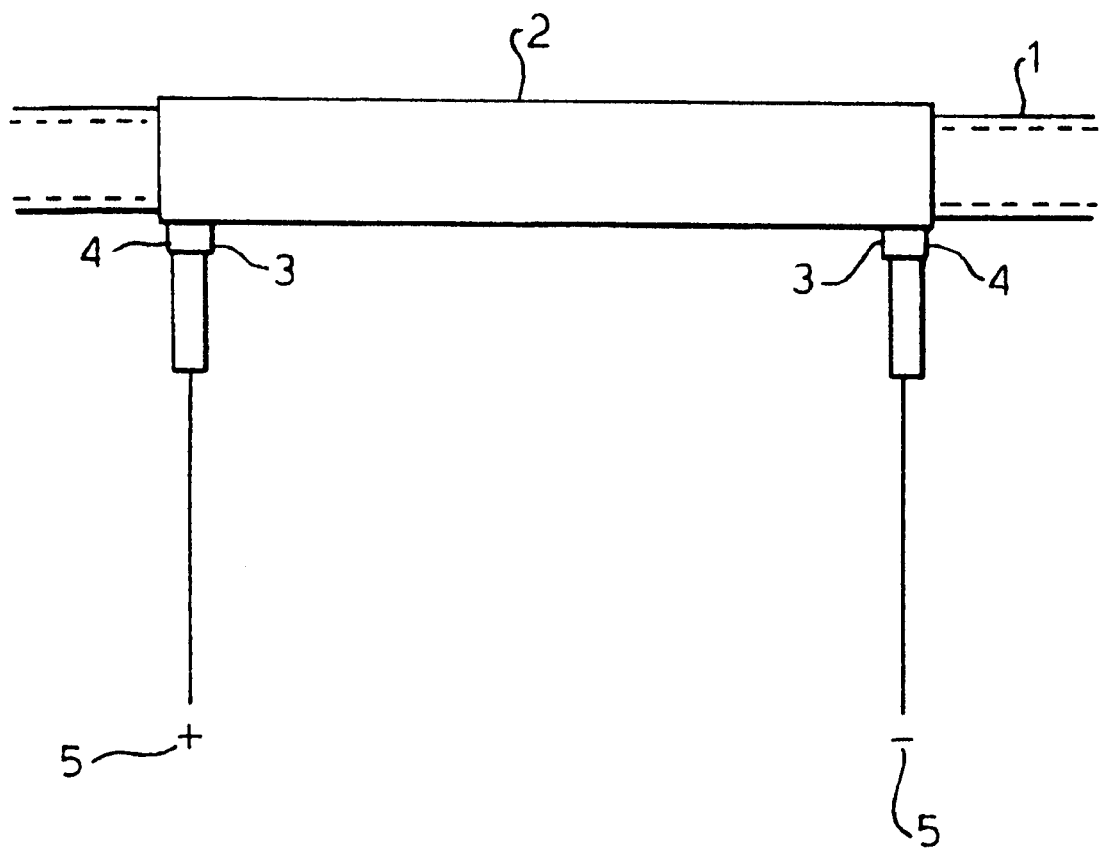
FIG. 4. Shows an apparatus for carrying out reactions involving multiple temperature stages and which utilises a strip of electrically conducting polymer to heat a capillary tube reaction vessel.

Referring to FIG. 4, a strip of electrically conducting polymer film 2 is wrapped around a capillary tube 1 and secured. The strip of polymer film 2 is provided with electrical connection points 3 to which an electrical supply 5 is connected via connection clips 4.

In use, current is passed through the polymer film 2, thereby heating the capillary tube 1 and any reagents placed inside the capillary tube 1.

Figure 5:
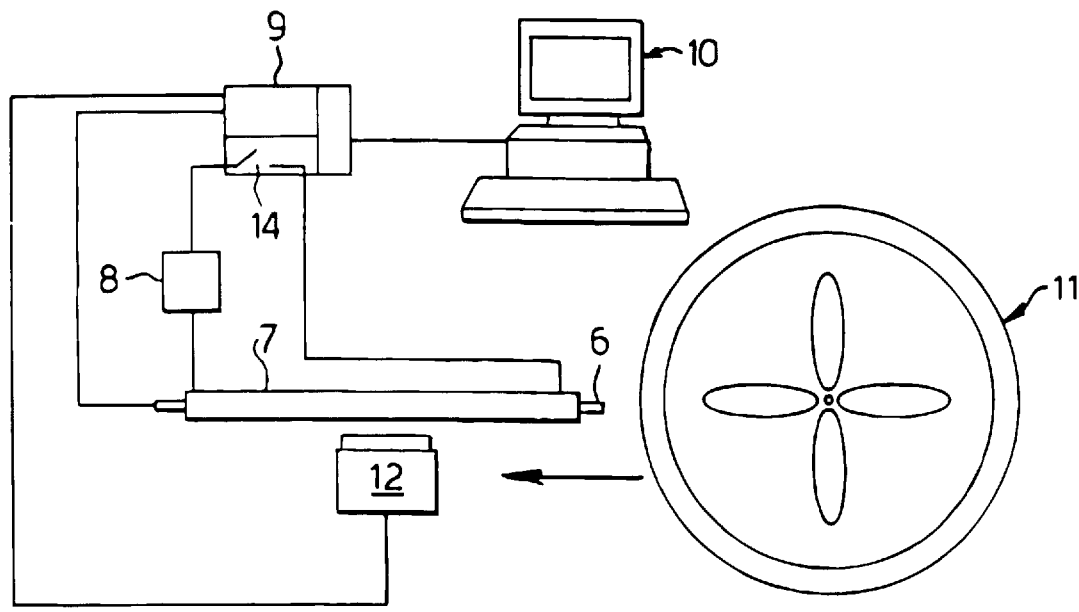
FIG. 5 shows a diagram of apparatus according to the invention for carrying out a PCR reaction.
Figure 6:
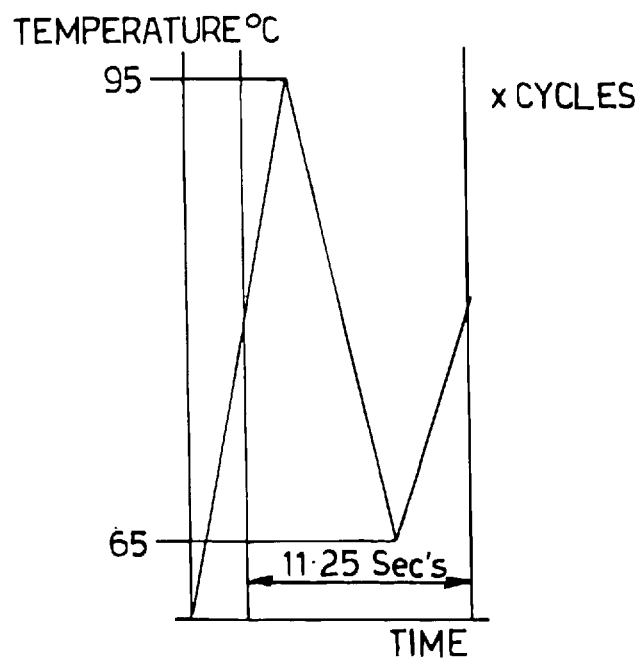
FIG. 6 shows a thermocycling profile used with the apparatus of FIG. 5.

The device of FIG. 5 was constructed in order to conduct PCR detections. A capillary tube 6 with a 1.12 mm internal diameter and 1.47 mm outer diameter was used as the reaction vessel. A strip of electrically conducting polymer 7 was wrapped around the tube and fastened so that it was held quite tightly to the external surface of the tube. Heating is therefore from all sides of the tube 6 minimising the temperature gradient across a sample in the tube 6.

Heating was provided by an electrical power supply 8 which was connected via an interface 9 to a computer 10 to allow the heating cycles to be controlled automatically. A fan cooler 11 was arranged to direct air onto the polymer 7. An infra-red thermocouple 12 was provided on the outside of the polymer 7 in order to monitor the temperature.

For the purposes of assessing the performance of the apparatus prior to Use, a K-type thermocouple was used to monitor the temperature inside the tube 6. The internal and external temperatures were then used to linearise the external temperature readings to the predicted sample temperature.

The heating polymer is connected to the power supply 8 and the circuit closed using the interface 9 and software. A switch 14 arranged to close the circuit was a fast optical relay which can switch every 10 ms. A second circuit was used to control two small electric fans or fan coolers 11 which provided forced air cooling of the reaction sample and which are run continuously. The control software was LabView which provides a user friendly graphical interface for both programming and operation. Current was applied initially with relatively high frequency in order the more rapidly to arrive at the required temperature. When the designated operating temperature was achieved the current was applied less frequently as required to maintain the designated operating temperature for the predetermined duration.

Figure 7:
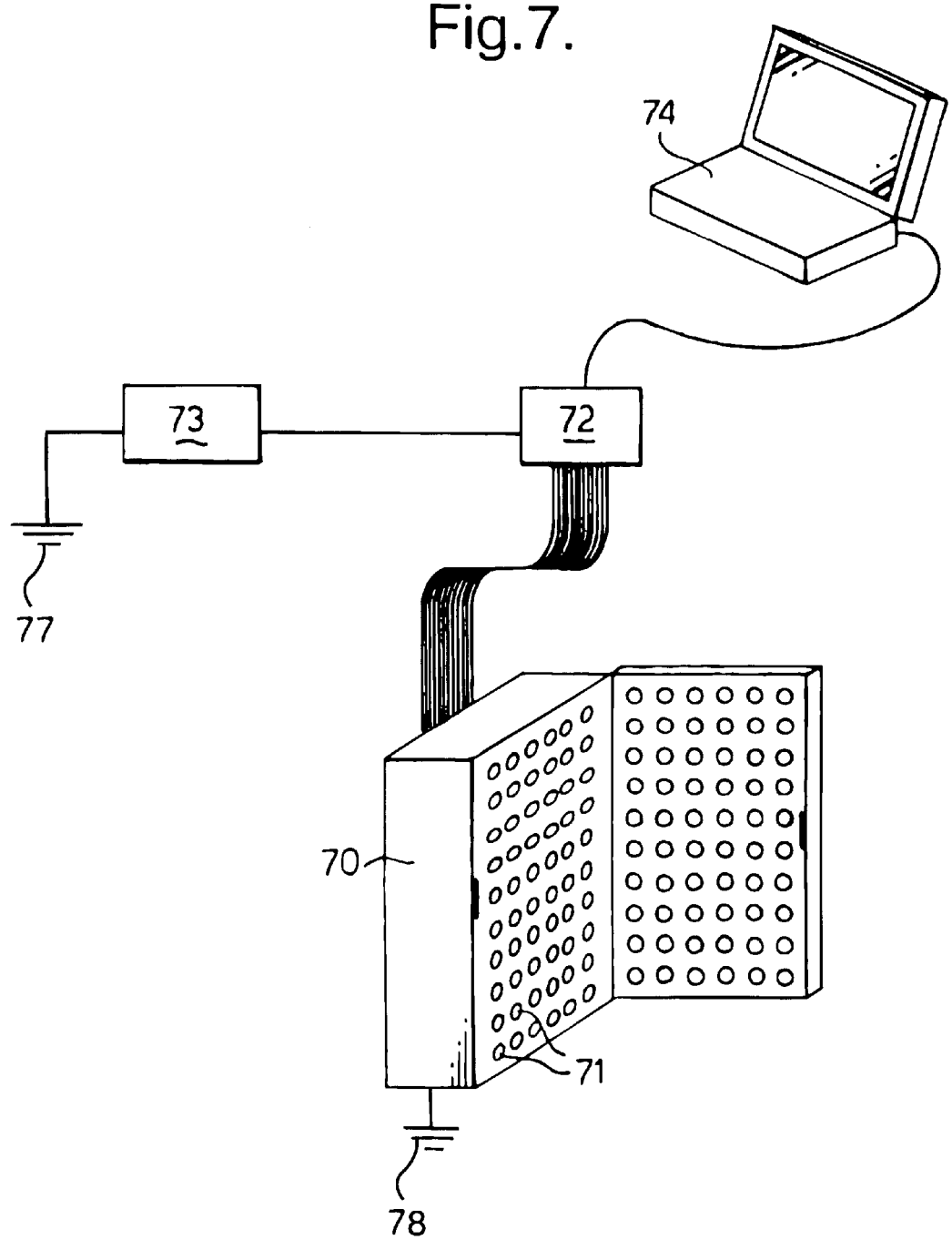
FIG. 7 is a schematic diagram of a portable PCR multidetector.

The apparatus shown in FIG. 7 comprises a lidded box 70 having insulative partitioning defining a plurality of detector element receptor bays 71. The box 70 is shown electrically connected via an interface unit 72 to a power source 73 and a computer 74. The connection is such as to permit different supplies to each of the bays 71. Each bay contains a thermocouple (not shown) for monitoring the temperature therein.

Figure 7A:
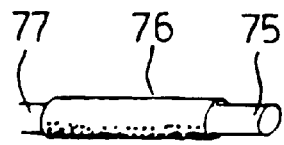
FIG. 7a is a diagram of a detector element for use in the apparatus of FIG. 7.

The detector element shown in FIG. 7a comprises a reaction tube 75 surrounded by a sheath 76. The sheath 76 is formed of a heating polymer and is connected to supply terminals 77 and 78.

After a tube 75 has been filled and stopped it can be offered to the appropriate bay 71 until the terminals 77 and 78 have clipped onto matching receptor terminals in the bays (not shewn). The apparatus when fully connected is arranged to permit displaying on the computer screen the connection status of each tube 75.

Closure of the lid to the box 70 completes the insulation of each bay and the retention of each tube 75 in its bay.

The computer programme is arranged for the separate identification of the molecule being searched for in each tube 75, which done it is arranged for the control of the appropriate temperature cycle for PCR to amplify that molecule if Present. When the cycles are complete the tube contents can be exposed to appropriate gene probe detectors to determine whether the molecule searched for was indeed present.

Of course the principle of the apparatus described in relation to FIGS. 7 and 7a may be realized in a variety of ways. It can be mobile rather than portable and arranged for the reception of detector elements in a form other than that of a tube, including a slide. Typically it is arranged to deal with 96 or 192 detector elements.

The following Example illustrates the invention.

EXAMPLE

Amplification of DNA

Using the apparatus of FIG. 5 with the K-type thermocouple removed, the following PCR reaction was effected.

A 100 base pair amplicon from a cloned *Yersinia pestis* fragment was amplified. Reaction conditions had previously been optimised using the Idaho RapidCycler™ and samples of the same reaction mixture were amplified in the Idaho RapidCycler™ as control reactions.

The reaction mixture placed in the tube 6 comprised the following:

50 mM Tris.HCl pH 8.3

3 mM $MgCl_2$ 2.5 mg/ml Bovine Serum Albumen

200 $\mu$M each of dATP, dTTP, dCTP and dGTP

10 $\mu$g/ml each PCR primers

25 Units/ml Taq Polymerase

The thermocycling profile was programmed as 95° C. for zero seconds, 55° C. for zero seconds, 72° C. for zero seconds as illustrated in FIG. 6. By way of comparison, a similar thermocycling profile was programmed into an Idaho RapidCycler™. Reaction volumes of 50 $\mu$l were used in both the polymer covered capillary vessel 6 and the Idaho RapidCycler™.

In this context, "zero seconds" means that as soon as the target temperature is reached, the program instructs the subsequent temperature to be induced. The precise time at which the reaction is held at the target temperature is therefore dependent upon the parameters and properties of the device used. In general however, it will be less than one second.

After 40 cycles in the capillary vessel, a 50 $\mu$l sample of the PCR product from each of the reactions were size fractionated by agarose gel electrophoresis in a 2% gel in 1×TAE buffer. DNA was visualised using ethidium bromide staining. The sample was run adjacent a sample from the Idaho RapidCycler™ (25 cycles) and a similar correctly sized amplicon was detected.

What is claimed is:

1. Apparatus for effecting reactions, said apparatus comprising a reaction vessel suitable for holding reagents so as to allow controlled heating thereof comprising a container for the reagents and contiguous therewith a sheath of an electrically conducting polymer which emits heat when an electric current is passed through it and is arranged to heat contents of the reaction vessel, and control means for controlling supply of current to the polymer, said control means being programmed to supply electric current so as to produce different temperature stages in the reagents held within the reaction vessel, the polymer being connectable to an electrical supply via the control means.

2. Apparatus as claimed in claim 1 wherein the electrically conducting polymer is in the form of a film.

3. Apparatus as claimed in claim 1 wherein the sheath is integral with the container.

4. Apparatus a claimed in claim 1 wherein the electrically conducting polymer is perforated or reticulated.

5. Apparatus as claimed in claim 1 wherein the reaction vessel comprises a capillary tube.

6. Apparatus as claimed in claim 1, wherein the control means is programmed to supply electric current so as to conduct reactions requiring multiple temperature stages within the reaction vessel.

7. Apparatus as claimed in claim 6 and wherein the control means is programmed such that multiple cycles of the reaction can be effected automatically.

8. Apparatus as claimed in claim 6 wherein the control means is programmed to supply current according to a predetermined time/temperature profile.

9. Apparatus as claimed in claim 1 further comprising a means for detecting a signal from a sample in the reaction vessel.

10. Apparatus as claimed in claim 1 wherein a surface of the reaction vessel is coated with said heated polymer.

* * * * *

UNITED STATES PATENT AND TRADEMARK OFFICE
CERTIFICATE OF CORRECTION

PATENT NO.      : 6,436,355 B1
APPLICATION NO. : 09/319441
DATED           : August 20, 2002
INVENTOR(S)     : Lee et al.

It is certified that error appears in the above-identified patent and that said Letters Patent is hereby corrected as shown below:

On Title Page Item (73) should read,
(73) Assignee:  The Secretary of State for Defence Farnborough, Hampshire (GB)

Signed and Sealed this

Twentieth Day of February, 2007

JON W. DUDAS
*Director of the United States Patent and Trademark Office*